United States Patent [19]

Cholakian et al.

[11] 4,399,538
[45] Aug. 16, 1983

[54] CONTROL SYSTEM FOR INHIBITING PROCESSING COMMUNICATIONS

[75] Inventors: Gary H. Cholakian, Norwalk; Arthur Rubinstein, East Norwalk; John H. Steinmetz, Norwalk, all of Conn.

[73] Assignee: Pitney Bowes Inc., Stamford, Conn.

[21] Appl. No.: 258,869

[22] Filed: Apr. 30, 1981

[51] Int. Cl.$^3$ .............................................. G06F 11/30
[52] U.S. Cl. ..................................... 371/66; 340/663; 371/4
[58] Field of Search ...................... 371/66, 4; 364/466, 364/200 MS File; 340/661, 663

[56] References Cited

U.S. PATENT DOCUMENTS

| | | | |
|---|---|---|---|
| 3,286,239 | 11/1966 | Thompson et al. | 371/66 |
| 3,321,747 | 5/1967 | Adamson | 371/66 |
| 3,890,494 | 6/1975 | Meshek et al. | 371/66 |
| 4,004,283 | 1/1977 | Bennett et al. | 364/200 |
| 4,084,232 | 4/1978 | Woods et al. | 364/200 |
| 4,307,455 | 12/1981 | Juhasz et al. | 371/66 |

OTHER PUBLICATIONS

Rayside et al., A Minicomputer Power Fail Detection System, Chemical Instrumentation, vol. 7, No. 3, 1976, pp. 211–218.

*Primary Examiner*—Charles E. Atkinson
*Attorney, Agent, or Firm*—Robert H. Whisker; William D. Soltow, Jr.; Albert W. Scribner

[57] ABSTRACT

A control system is employed to selectively inhibit false signal transmissions between a communications processor and a plurality of peripheral devices during transient power states. The control system includes a comparator which detects a decrease in the unregulated power supply voltage as compared to the regulated voltage to anticipate an impending loss in regulated voltage. In response to a detected drop in unregulated voltage, a transistor interrupts the power supply to communications lines. Simultaneously, the transistor interrupts the power supply to a light source of an optically coupled relay which is employed to actuate a peripheral such as a mailing machine. In order to assure that the communications processor will initiallize after a transitory drop and a recovery in line voltage, a processor reset signal is also generated by the control system as a function of a detected decrease in unregulated voltage.

14 Claims, 4 Drawing Figures

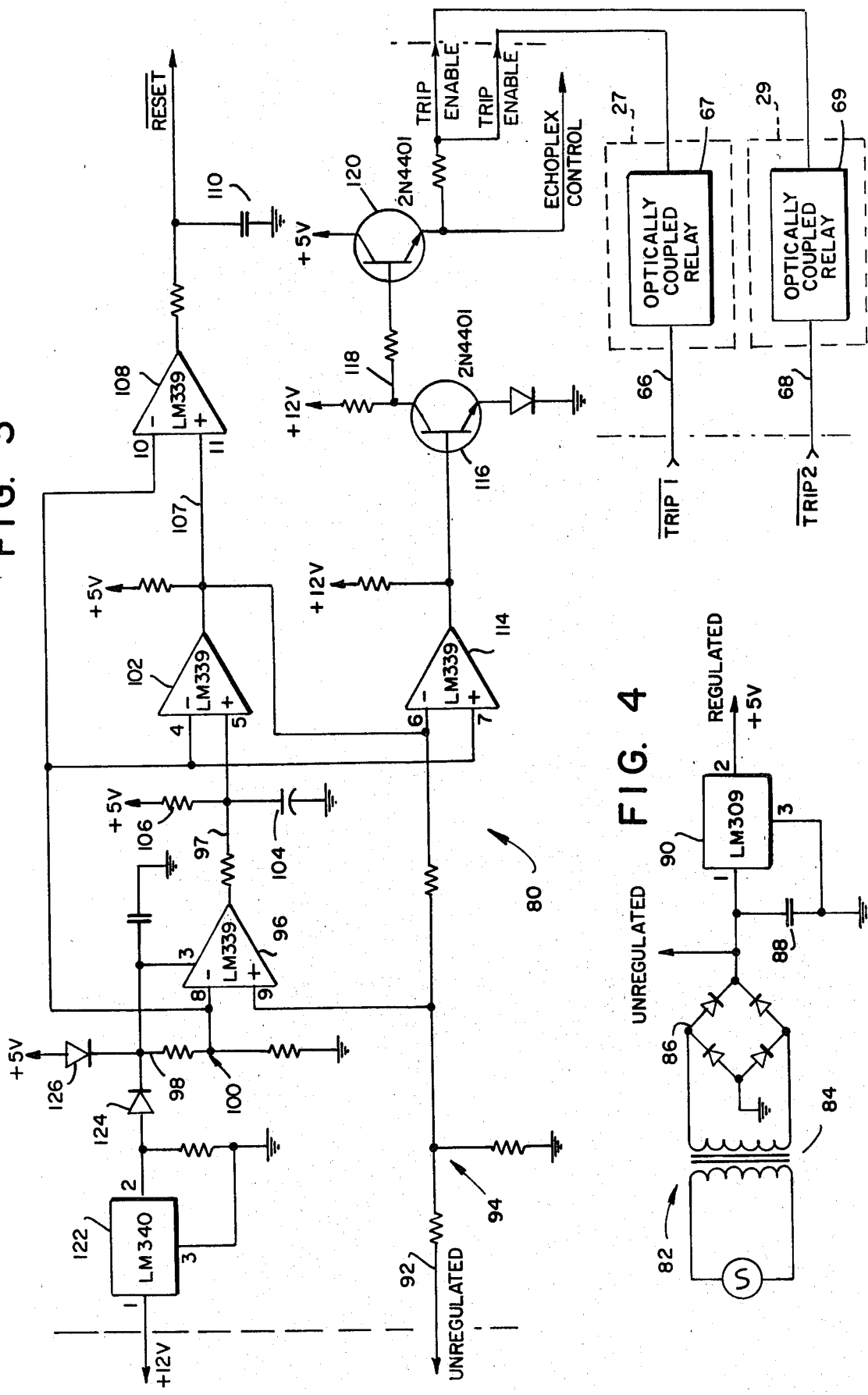

CONTROL SYSTEM FOR INHIBITING PROCESSING COMMUNICATIONS

BACKGROUND OF THE INVENTION

1. Field of the Invention

This invention relates generally to communications to and from processors and more particularly to a control system for inhibiting spurious signal transmissions which might occur as a result of decreases in power supply voltage.

2. Related Applications

The control system of the present invention may be employed in conjunction with and carried on an interface board which interconnects a postage value determining system processor with a plurality of peripheral devices. Such interface is described in a copending application of Daniel F. Dlugos et al. entitled Postage Scale Peripheral Interface, Ser. No. 235,241, filed Feb. 17, 1981 and assigned to the assignee of the present invention. The interface includes a peripheral microcomputer, the transmit and receive lines of which are multiplexed among selected mailing system peripherals. Upon receipt of an appropriate command from a postage scale system processor, the peripheral microcomputer establishes communications links with selected peripheral devices, receiving data from either the system processor or a peripheral and transmitting such data employing appropriate communications subroutines.

Among the mailing system peripheral devices available are one or more electronic postage meters which set postage amounts. The electronic postage meters are coupled to a mailing machine which includes a rotating drum mechanism for printing the postage amount set by the meter. The mailing machine is controlled by an optically coupled relay having a light source and a photodetector.

Unfortunately, during mailing system operating conditions, the communications links between the interface microcomputer and the peripherals were subject to spurious signal transmissions at transient power stages such as power up and power down.

Spurious signal transmissions occurred in instances wherein the peripheral devices such as a mailing machine utilized a separate power supply. As the interface power went off, the supply voltage passed through a transient state wherein the logic controlling the communications lines lost functional control of the signal levels on the lines. During this stage power might still be applied to a peripheral. With respect to the mailing machines, the optically coupled relay interpreted the decaying voltage level on its "trip" line at a trip signal and actuated the mailing machine to print the postage amount previously set by the meter.

Other problems were also encountered during transient power states. Some peripheral devices which were still capable of reading the communication lines interpreted changes in signal levels as request or data transmission signals.

While some of the difficulties could be alleviated somewhat by simultaneously applying power to both the peripherals and the communications controller interface so both systems would initialize, this was often impractical and ineffective with respect to optically coupled relays and power down conditions.

A further problem was that a momentary dropout in line supply voltage may result in a drop in regulated power supply voltage to the communications processor to a level which would result in a momentary loss of control. When the voltage level was restored, the processor might commence random program execution and might even commence a meter tripping cycle.

SUMMARY OF THE INVENTION

Communications links between a mailing system communications interface processor and a plurality of peripheral devices are selectively inhibited by a control system to preclude spurious signal transmissions which might otherwise occur on power up, power down or with line voltage fluctuation. The control system samples both regulated and unregulated power supply voltage to anticipate an impending loss in regulated power supply voltage.

A comparator detects a decrease in the unregulated voltage as compared to the regulated voltage. The comparator output is coupled to a capacitor which discharges to generate a full pulse width signal which is received at a subsequent comparator stage. A final comparator stage generates a corresponding width reset signal which is transmitted to a reset pin of the interface processor. The processor thus initiallizes as a result of a transient drop and restoration of supply voltage.

An intermediate stage comparator signal triggers the switching of a transistor which interconnects the regulated voltage supply with a plurality of communications lines. When an impending decrease in regulated voltage level is sensed, the transistor interrupts the regulated voltage supply from the communications lines and thus inhibits signal level changes on the communications lines. In addition, when the transistor switches, it disconnects the power supply from a light source of an optically coupled relay which is employed to trip a mailing machine.

When power is off, the capacitor connected to the initial stage comparator output remains discharged. On a power on cycle, the capacitor begins to recharge. Until the capacitor recharges the control system maintains the reset signal to the processor and the transistor remains in its nonconductive state inhibiting the communication lines and the optically coupled relay.

From the above compendium, it will be appreciated that it is an object of the present invention to provide a control system for communications between a processor and a plurality of peripheral devices which is not subject to the disadvantages aforementioned.

A further object of the present invention is to provide a communications control system of the general character described which inhibits signal transmissions along communications lines during transient power stages.

Another object of the present invention is to provide a communications control system of the general character described between a mailing system communications processor and a plurality of mailing system peripheral devices which inhibits signal transmissions during transient power stages.

A still further object of the present invention is to provide a communications control system of the general character described between a processor and a peripheral device actuated by an optically coupled relay and wherein the control system inhibits actuation of the relay during transient power stages.

A further object of the present invention is to provide a communications control system for inhibiting signal transmissions which anticipates an impending loss in regulated power supply.

Another object of the present invention is to provide a communications control system of the general character described for inhibiting communications links during transient power stages and which monitors the unregulated voltage of a power supply to anticipate a loss in regulated voltage.

Yet another object of the present invention is to provide a communications control system of the general character described for inhibiting communications links during transient power stages which anticipates a loss in the regulated voltage of a power supply by comparing the regulated voltage level to the unregulated voltage level of the power supply.

Other objects of the present invention in part will be obvious and in part will be pointed out hereinafter.

With these ends in view, the invention finds embodiment in certain combinations of elements, arrangements of parts and series of steps by which the objects aforementioned and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention:

FIG. 3 is a schematic illustration of the power monitoring control system; and

FIG. 4 is a schematic illustration of a typical power supply.

DESCRIPTION OF THE PREFERRED EMBODIMENT

Figure 1:
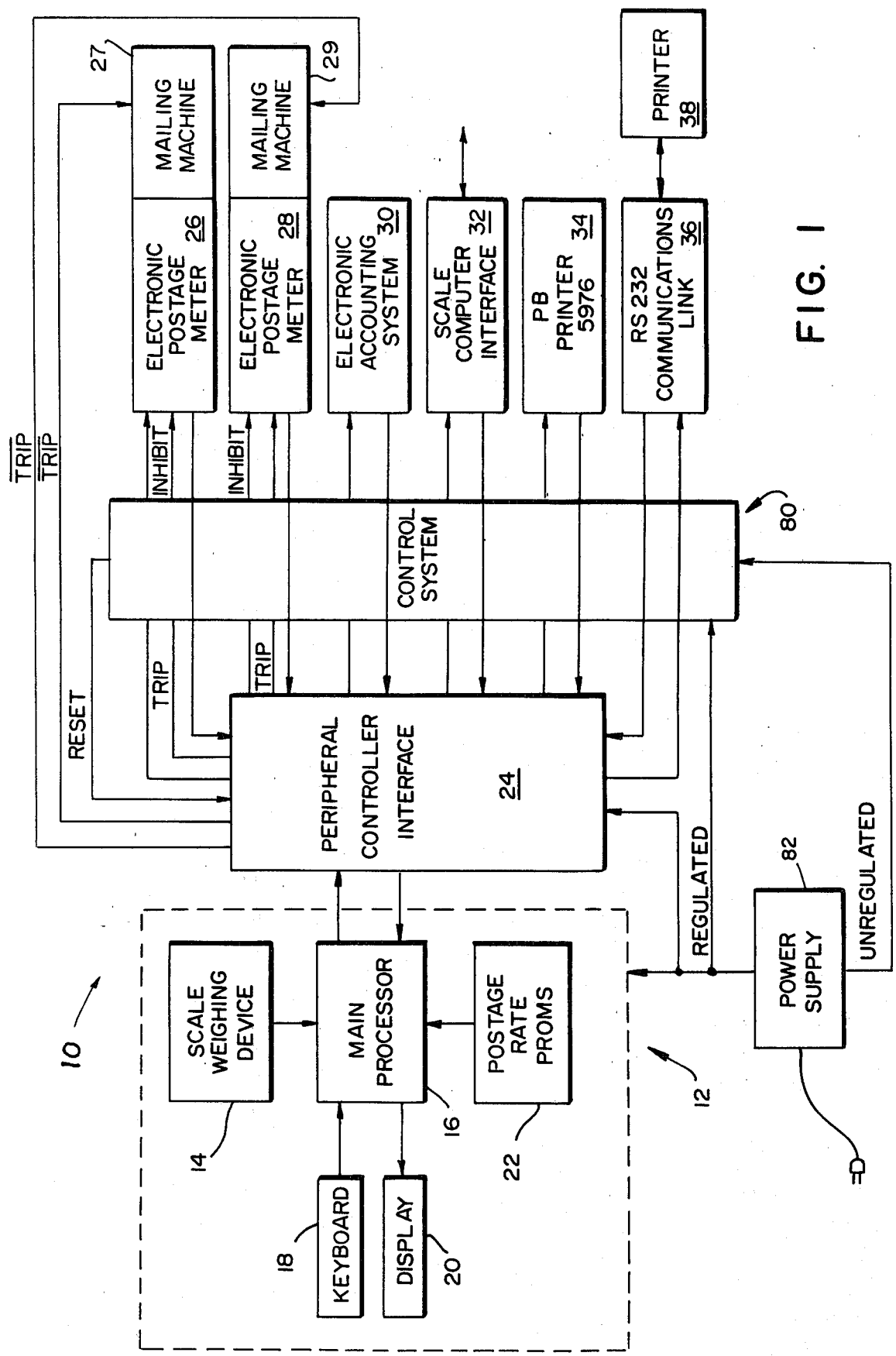
FIG. 1 is a schematized block diagram of a typical automated mailing system and illustrating a communications control system constructed in accordance with and embodying the present invention interconnecting a peripheral controller interface and a plurality of mailing system peripheral devices.

Referring now in detail to the drawings, the reference numeral 10 denotes generally an automated mailing system including a processor controlled stand-alone postage scale 12. The scale 12 is adapted to calculate the postage or other transportation charges required to transport an article. In most instances, transportation charges are based upon the article weight, class of transportation and, with respect to certain classes, distance to destination (zone). The scale 12 includes a weighing device 14 having a tray for receiving the article to be mailed. The weighing device 14 is interconnected to a main system processor 16. The system processor 16 is programmed to compute the requisite postage or other transportation charges for an article placed upon the platform.

The data necessary for the determination of article postage, e.g. destination operands, class of transportation operands, etc., are entered at a keyboard 18 and corresponding signals are transmitted to the system processor 16. Keyboard and calculated information are indicated at a display 20.

With the weight, class of transportation and destination zone operands entered, the system processor 16 determines the requisite postage by reference to a postage rate PROM 22 and provides a signal to the display 20 for indicating the calculated postage amount. A suitable microprocessor for implementation as the system processor 16 is an Intel 8085 processor available from Intel Corporation of Santa Clara, Calif. The foregoing mode of operation of the scale 12 is well known to those of skill in the art and typically illustrated in U.S. Pat. No. 4,135,662 entitled Operator Prompting System issued Jan. 23, 1979 to Daniel F. Dlugos and assigned to the assignee of the present invention.

The scale 12 is constructed as a stand alone unit for use without peripheral devices associated with a complete mailing system yet maintains versatility for controlling, transmitting data to and receiving data from various peripheral devices if a complete mailing system is desired by the user. As such, the scale 12 is available at an economical cost because its circuit does not incorporate an interface for communication with mailing system peripheral devices.

As fully described in the copending related application Ser. No. 235,241 incorporated herein by reference, a peripheral controller interface 24 is provided as part of a separate self-contained board and is adapted to establish communications links between the system processor 16 and various mailing system peripheral devices such as one or more electronic postage meters 26, 28. The meter 26 is adapted to dispense U.S. Postal Service postage denominations, while the meter 28 is adapted to print private carrier transporation charges, e.g. United Parcel Service.

Electronic postage meters of this general type are described in U.S. Pat. No. 3,978,457 entitled Microcomputerized Electronic Postage Meter System issued Aug. 31, 1976 to Frank P. Check, Jr. et al. and assigned to the assignee of the present invention. The meters 26, 28 set the postage amounts to be imprinted and an associated mailing machine 27, 29 is employed to trip the respective meter to print the amount set.

The electronic postage meters 26, 28 are programmed for communication with the system processor 16 pursuant to a communications routine which is serial character asynchronous, bit synchronous, in message form, with the bits of the message being timed in accordance with a given schedule. The messages are returned or echoed by the recipient, bit by bit for checking. This communications routine has been designated "Echoplex".

A further peripheral device which is programmed for communication with the main system processor 16 through the peripheral controller interface 24 and employing the Echoplex communications routine and protocol is an electronic accounting system 30. Additionally, a computer interface 32 and a Pitney Bowes Model 5976 printer 34 may be employed, both of which communicate through the Echoplex routine.

A further communications link 36 is provided for communications through an RS 232 hardware standard. The RS 232 communications link 36 could interface with one of several available RS 232 printers 38 or any other desirable peripheral device which communicates in ASCII code, for example.

Figure 2:
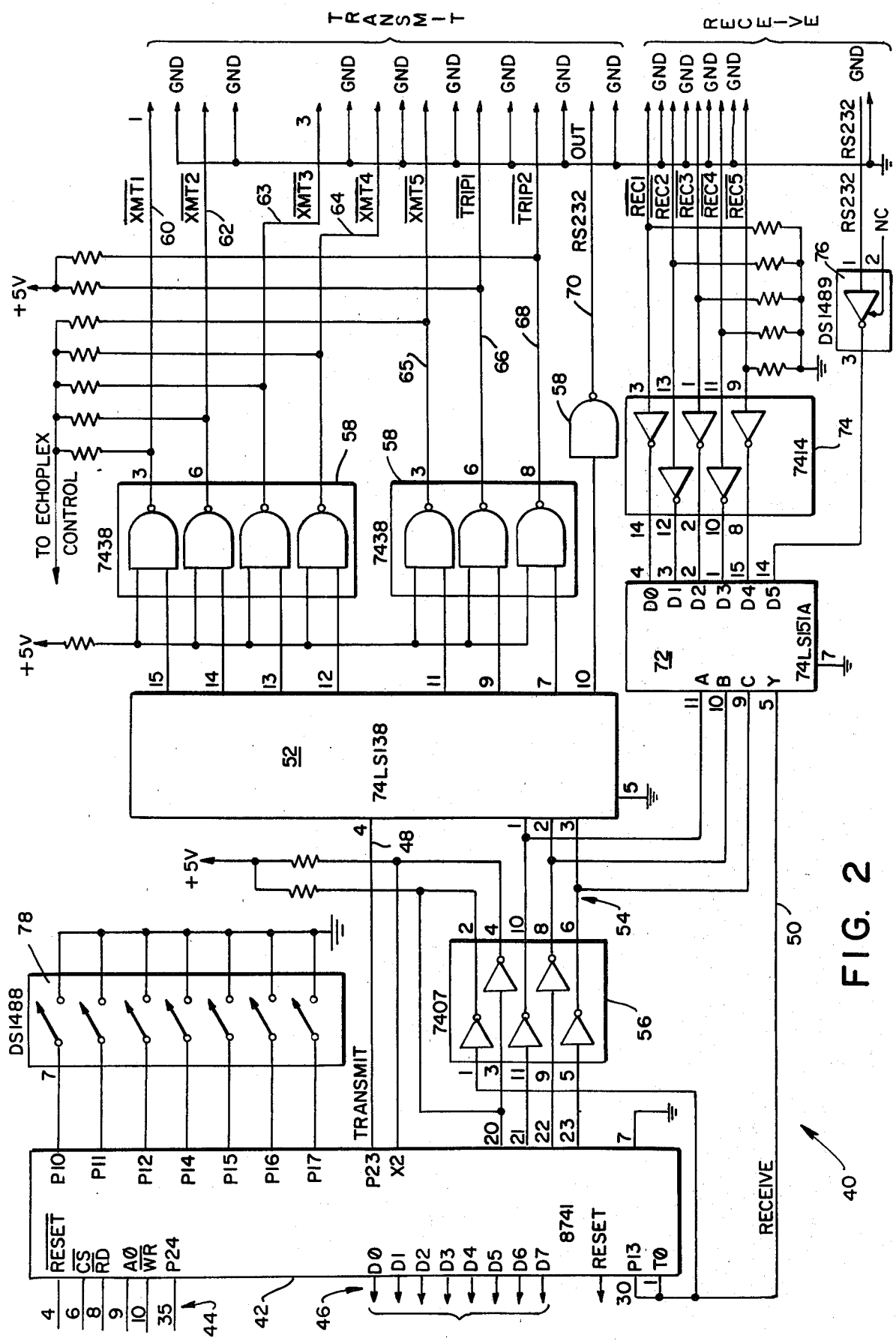
FIG. 2 is a schematic illustration of the peripheral controller interface circuit.

In FIG. 2, a schematized block diagram of a peripheral controller interface board 40 is illustrated. The interface includes a peripheral eight bit controller 42 which may comprise an Intel type 8741 or 8041 microcomputer. The controller 42 receives command signals from the system processor 16 through a plurality of input lines denoted generally by the reference numeral 44. Data communication between the system processor and the controller 42 is carried over a plurality of data lines 46 which extend to a data bus (D0-D7). The controller 42 includes a CPU section, a program memory and temporary buffers for commands and data flowing between the CPU section and the system processor 16.

Communication between the controller 42 and the selected peripheral devices extends serially along a transmit line 48 and a receive line 50. The transmit line 48 extends to a multiplexer 52. The multiplexer 52 will output the signal on the transmit line 48 to one of eight output lines depending upon the signal states on three binary select input terminals. Three select lines denoted generally by the reference numeral 54 extend from suitable terminals of the controller 42 through a buffer 56 to the select input terminals of the multiplexer 52.

Seven output lines of the multiplexer 52 extend through a buffer 58 comprising a NAND gate for each line. From the NAND gates, a transmit line 60 extends to the electronic postage meter 26, while a further transmit line 62 interconnects with the electronic postage meter 28. A transmit line 63 extends to the electronic accounting system 30 and a transmit line 64 is provided for transmission of signals to the scale computer interface 32. A further transmit line 65 is provided for communication to the printer 34.

A trip transmit line 66 extends to an optically coupled relay 67 for actuating the mailing machine 27 associated with the postage meter 26, and a similar transmit line 68 extends to an optically coupled relay 69 of the mailing machine 29.

In addition, a transmit line 70 is provided for communication to the RS 232 interface 36 for actuation of a suitable device such as the printer 38. In most instances, either the Pitney Bowes printer 34 which communicates in an Echoplex protocol or an RS 232 printer 38 will be employed.

When the controller 42 provides an appropriate signal through the select lines 54, such signal is simultaneously applied to both the transmit multiplexer 52 and a data selector multiplexer 72 which interconnects a selected one of six possible receive lines extending from the peripheral devices.

Each of the receive lines extending between a signal transmitting peripheral device and the data selector multiplexer 72 includes suitable buffers which comprises a resistance to ground and an inverter 74. The receive line extending from the RS 232 interface 36 and the multiplexer 72 includes a suitable buffer 76.

It should be additionally noted that a switch bank 78 is interconnected to the PORT 1 I/O lines of the controller 42. The switch bank is read by the controller 42 in response to a command from the system processor 16 to determine a peripheral device in the system. For example, a switch may indicate a specific RS 232 printer 38 for formatting data to be loaded into the transmit buffer by the system processor 16.

The controller 42 is programmed to handle the communications between the system processor 16 and any peripheral devices selected to be employed in the mailing system.

Pursuant to the present invention, a control system 80 is provided for inhibiting false signal transmissions to the various peripheral devices during transient power states. Such false signals may be generated on power up and power down conditions or in instances wherein a transient drop in line voltage occurs.

The control system may be mounted to the peripheral controller interface board 40 and monitors the regulated and unregulated voltage levels of a power supply 82. The power supply 82 may typically include a transformer 84, a bridge rectifier 86, a capacitance filter 88, and a regulator 90, all illustrated in FIG. 4. The regulator 90 provides a constant five volt output with an unregulated input voltage ranging from approximately twelve to seven volts. When the input unregulated voltage drops below seven volts, the regulated output will begin to decay.

The control system 80 monitors the unregulated voltage supplied to the regulator 90 for the purpose of detecting a drop in the unregulated voltage to a level which would result in a decay in the regulated voltage level output. When the regulated voltage level drops below its five volt level, the controller 42 will eventually be supplied with a voltage insufficient to maintain control, e.g. 3.5 volts. Similarly, the logic controlling the transmit lines, as well as the trip lines (the multiplexer 52 and the buffers 58), will lose control over such lines.

In the copending related application, the interface transmit lines 60, 62, 63, 64, and 65 were interconnected to the five volt power supply. The peripherals interpreted changes in signal level on such lines as requests to transmit data. With respect to the mailing machine trip lines 66, 68, when the signal levels were lowered on these lines such state was interpreted as a trip signal and the mailing machines printed the last postage amount set.

Referring now to FIG. 3, the control system 80 includes a line 92 connected to a tap of the power supply 82 at the unregulated voltage level. A voltage divider network 94 comprising a series resistor and a resistor to ground is provided in the line 92 to reduce the unregulated voltage level to a proportionate level which is presented at an input to a comparator 96. The comparator 96 additionally receives a proportionate level sampling of the regulated voltage from the power supply 82 along a line 98 which also includes a similar voltage divider network 100.

When there is a dropout in line voltage or when the power is switched off, the output of the transformer 84 and the unregulated voltage begin to decrease prior to any decrease in the regulated voltage. The comparator 96 will detect the decrease in unregulated voltage as compared to the regulated level and will switch to a low output level. A line 97 having a series resistor interconnects the output of the comparator 96 to the input of a second stage comparator 102. A capacitor 104 is interconnected to the line 97 and is maintained in a charged condition by a current limiting resistor 106 which extends to the regulated five volt supply.

When the output of the first stage comparator 96 is switched to its low level, the capacitor 104 discharges and the signal level at the input to the comparator 102 will be maintained low during a minimum fixed recharge interval determined by the values of the capacitor 104 and of the current limiting resistor 106.

The other input to the second stage comparator 102 is the proportionate level of the regulated five volt supply which was received at the first stage comparator 96. The second stage comparator 102 is therefore switched to a low signal level output upon the first stage comparator switching to a low output, however the second stage comparator output will be maintained low for a fixed duration after the first stage output returns to a high level.

A line 107 extends between the output of the comparator 102 and an input of a third stage comparator 108. The line 107 is normally maintained at a high signal level by a series resistance to the five volt regulated supply. Upon the switching of the comparator 102, however, the line 107 provides a low signal level to the comparator 108. The comparator 108 compares the signal levels on the line 107 with the proportionate level of the five volt power supply. Thus, when the second stage comparator 102 generates a low output, the comparator 108 will generate a low signal output.

Connected to the output of the comparator 108 is a series resistor, a capacitor 110 extending to ground and a line which extends to the $\overline{\text{RESET}}$ pin of the interface controller 42. The controller 42 normally provides a high signal level on its $\overline{\text{RESET}}$ pin which charges the capacitor 110. When the output of the comparator 108 switches to the low level, the capacitor 110 discharges which lowers the signal level on the $\overline{\text{RESET}}$ pin of the controller 42, causing the controller to reset.

Thus, upon a transitory voltage drop in the regulated voltage to a level which may cause the controller to momentarily lose control but not a complete reduction in regulated voltage to ground level, the control system 80 generates a full pulse with reset signal.

In order to provide corresponding inhibits of the communications lines and the trip lines, a fourth stage comparator 114 is provided. One input to the comparator 114 is connected to the output of the second stage comparator 102. A further input line is connected to the proportionate level of the five volt regulated power supply. When the comparator 102 switches to a low output, the comparator 114 switches from a low output to a high output. The output of the comparator 114 is connected to the base of an NPN transistor 116. When the comparator 114 switches to a high output level, the transistor 116 is switched on and the signal level at its collector becomes low. A line 118 interconnects the collector of the transistor 116 with the base of a further NPN transistor 120 and serves to turn the transistor 120 off when the transistor 116 is switched on.

The collector of the transistor 120 is connected to the five volt regulated power supply and its emitter includes a line designated ECHOPLEX CONTROL which provides high signal levels on the Echoplex transmit lines 60, 62, 63, 64 and 65.

When the transistor 120 is switched off, the five volt power supply will be disconnected from the transmit lines and a subsequent loss of control over such transmit lines by the output buffer 58, the multiplexer 52 or the controller 42 will not result in changes in signal levels on such lines.

A pair of lines designated TRIP ENABLE are also connected to the emitter of the transistor 120 through a series resistor. Each TRIP ENABLE interconnects the optically coupled relays 67, 69 with the five volt regulated supply through the transistor 120 when the transistor 120 is switched on.

The optically coupled relays 67, 69 may comprise a type JTA series solid state optically coupled relay available from Theta-J Corporation. Such relays include a light source such as a light emitting diode, an optical detector and a power switch for operating a load. The TRIP ENABLE lines extend to the light source. To actuate the light source, hence the relay, a low signal level is provided on the $\overline{\text{TRIP}}$ line extending to the light source.

Because the transistor 120 is switched off in anticipation of a decrease in regulated voltage level, the optically coupled relays 67, 69 are inhibited from actuating in the presence of low signal levels on the trip line 66, 68.

It should be appreciated that the control system 80 will function in an identical manner in power down conditions as previously described with reference to a transient drop in unregulated voltage due to a temporary line voltage drop. In a power down cycle, the unregulated voltage will begin to decrease before the regulated voltage and such decrease will be detected by the comparator 96.

The capacitor 104 will become discharged during power down and remain discharged when power is off. On a power up cycle after the output of the first stage comparator 96 turns to a high level, the output of the comparator 102 will remain low for the predetermined time interval required for charging. As such, the control system 80 assures that the controller 42 will be reset and inhibits spurious signal transmissions during all transient power states including power up and power down cycles.

It should be appreciated that the comparators of the control system 80 should remain operative and not lose control in the presence of the decaying five volt power supply to the interface. In order to assure that the control system will not lose control of its inhibit functions an auxiliary five volt power supply of extended duration is provided.

Accordingly, the control system 80 includes a tap to a twelve volt regulated (relatively unloaded) output of the power supply 82. A five volt regulator 122 is employed to generate an auxiliary five volt regulated output which extends through a diode 124 to the line 98. The line 98 extends to the power input, pin 3 of the comparator package. The normal five volt regulated supply extends to the line 98 through a similar diode 126.

The twelve volt regulated supply at the regulator 122 will not decay as rapidly as the loaded five volt regulated power supply to the interface. Thus, the comparators of the control system 80 will remain operative, powered by the auxiliary five volt regulated output power, after the normal five volt power supply begins to decay, thereby assuring that the control system will operatively inhibit spurious signal transmissions during transient power supply stages.

Thus, it will be seen that there is provided a control system for inhibiting processor communications which achieves the various objects of the invention and is well suited to meet the conditions of practical usage.

As various changes might be made in the control system as set forth herein, it is to be understood that all matter herein described or shown in the accompanying drawings is to be interpreted as illustrative and not in a limiting sense.

Having thus described the invention, there is claimed as new and desired to be secured by Letters Patent:

1. A control system for selectively controlling communications signals on signal lines connecting a transmitting means powered by a power supply, and a device powered by a second power supply the control system including monitoring means operatively connected to the power supply, the monitoring means including means for detecting a transient power state, the detecting means generating a signal in response to a detected transient power state, and inhibiting means, the inhibiting means receiving the detecting means signal and in response thereto inhibiting signal level changes on said lines, whereby spurious communications signal transmissions during transient power states are inhibited.

2. A control system for selectively controlling communications signals from a transmitting means constructed in accordance with claim 1 wherein the transmitting means comprises a processor, the inhibiting means including means for generating a reset signal in response to receipt of the detecting means signal, the processor receiving the reset signal and in response thereto entering a reset routine.

3. A control system for selectively controlling communications signals constructed in accordance with claim 1 wherein the transmitting means comprises a logic control means for selectively varying the signal level on a transmit line, the inhibiting means comprising means for preventing the logic control from changing the signal level on the transmit line.

4. A control system for selectively controlling communications signals constructed in accordance with claim 3 wherein the transmit line is connected to the power supply, the inhibiting means receiving the detecting means signal and in response thereto disconnecting the power supply from the transmit line.

5. A control system for selectively controlling communication signals constructed in accordance with claim 1 wherein the transmitting means transmits signals to an optically coupled relay along a transmit line, the relay including a light source, the transmit line extending to the light source, the light source including a line extending to a voltage supply, the inhibiting means disconnecting the light source from the voltage supply in response to receipt of the detecting means signal, whereby the relay is disabled when the power supply is in a transient state.

6. A control system for selectively controlling communication signals constructed in accordance with claim 1 wherein the power supply provides a regulated voltage output, the transmitting means being powered from the regulated voltage output, the detecting means including means for sampling the unregulated voltage level of the power supply and means for anticipating an impending loss in the regulated voltage output level.

7. A control system for selectively controlling communication signals constructed in accordance with claim 6 wherein the detecting means includes comparator means for sampling the regulated voltage output level and the unregulated voltage level and in response to a detected decrease in unregulated voltage level generating the detecting means signal, the detecting means signal being indicative of an impending decrease in the regulated voltage level.

8. A control system for selectively controlling communication signals constructed in accordance with claim 7 wherein the inhibiting means includes means receiving the detecting means signal and in response thereto generating a signal of minimum duration, means receiving the signal of minimum duration and in response thereto inhibiting the transmission of signals from the transmitting means, whereby a transient reduction and restoration of power supply output will result in a minimum duration inhibition of signal transmissions.

9. A control system for selectively controlling communication signals constructed in accordance with claim 8 wherein the means generating the minimum duration signal comprises a capacitor.

10. A control system for selectively controlling communication signals constructed in accordance with claim 1 wherein the power supply includes a regulated voltage output, the transmitting means being powered from the regulated voltage output, the control system further including an auxiliary regulated voltage supply, the control system being powered by the auxiliary regulated voltage supply, whereby when the regulated voltage power to the transmitting means decays the control system will remain functionally operative.

11. A method of preventing the transmission of spurious signals on signal lines connecting a transmitting means powered by a power supply and a device powered by a second power supply during transient power states, the method comprising the steps of:
   (a) monitoring the power supply,
   (b) detecting a decrease in the power supply unregulated voltage level, and
   (c) inhibiting signal level changes on said lines upon detection of a decrease in the unregulated voltage level.

12. A method of preventing spurious signal transmissions from a transmitting means as set forth in claim 11 wherein the transmitting means comprises a processor, the step of inhibiting the transmission of signals including the step of transmitting a reset signal to the processor.

13. A method of preventing spurious signal transmissions from a transmitting means as set forth in claim 11 wherein the transmitting means comprises a logic control which selectively varies the signal level appearing on a transmit line, the step of inhibiting the transmission of signals from the transmitting means including the step of disabling the transmit line.

14. A method of preventing spurious signal transmissions from a transmitting means as set forth in claim 11 further including the step of monitoring the regulated voltage level of the power supply, the step of detecting a decrease in the power supply unregulated voltage level including the step of comparing the regulated voltage level with the unregulated voltage level.

* * * * *